(12) United States Patent
Becquey

(10) Patent No.: US 6,807,508 B2
(45) Date of Patent: Oct. 19, 2004

(54) SEISMIC PROSPECTING METHOD AND DEVICE USING SIMULTANEOUS EMISSION OF SEISMIC SIGNALS BASED ON PSEUDO-RANDOM SEQUENCES

(75) Inventor: Marc Becquey, Rueil Malmaison (FR)

(73) Assignee: Institut Francais du Petrole, Rueil Malmaison Ceder (FR)

( * ) Notice: Subject to any disclaimer, the term of this patent is extended or adjusted under 35 U.S.C. 154(b) by 0 days.

(21) Appl. No.: 10/372,932

(22) Filed: Feb. 26, 2003

(65) Prior Publication Data

US 2003/0167127 A1 Sep. 4, 2003

(30) Foreign Application Priority Data

Mar. 1, 2002 (FR) .......................................... 02 02666

(51) Int. Cl.$^7$ ................................................ G01V 1/28
(52) U.S. Cl. ..................................................... 702/124
(58) Field of Search ............................ 702/14, 17, 18; 367/39, 41

(56) References Cited

U.S. PATENT DOCUMENTS 3,234,504 A    2/1966  Wischmeyer 3,264,606 A    8/1966  Crook et al.

FOREIGN PATENT DOCUMENTS

FR         2589587          7/1987

*Primary Examiner*—Donald McElheny, Jr.
(74) *Attorney, Agent, or Firm*—Antonelli, Terry, Stout & Kraus, LLP

(57) ABSTRACT

A seismic prospecting method and device is disclosed using simultaneous emission, by vibrators, of seismic signals obtained by phase modulating a periodic signal whose amplitudes and derivatives with respect to the amplitude time are equated to zero at the beginning and at the end of each period, by pseudo-random sequences. The seismic signals are formed either from elementary sequences whose length is at least equal to the product of the number of seismic sources vibrating simultaneously by a listening time, or from the elementary sequence extended, before and after, with parts whose length is at least equal to the listening time, the reception and recording of the signals reflected by the subsoil discontinuities in response to the signals emitted, and the processing of the recorded signals. The respective contributions of the various seismic sources are isolated by correlating the signals received and recorded.

30 Claims, 4 Drawing Sheets

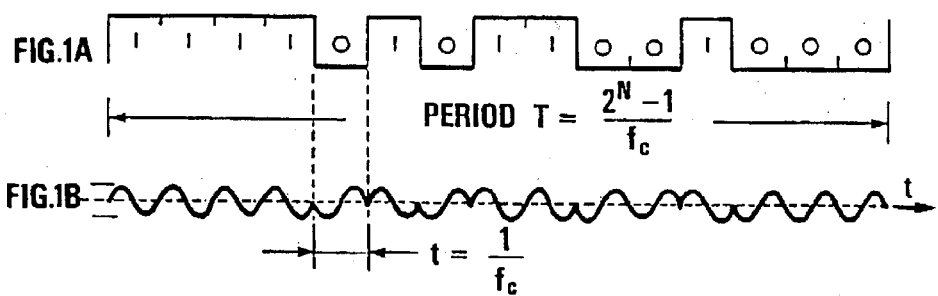
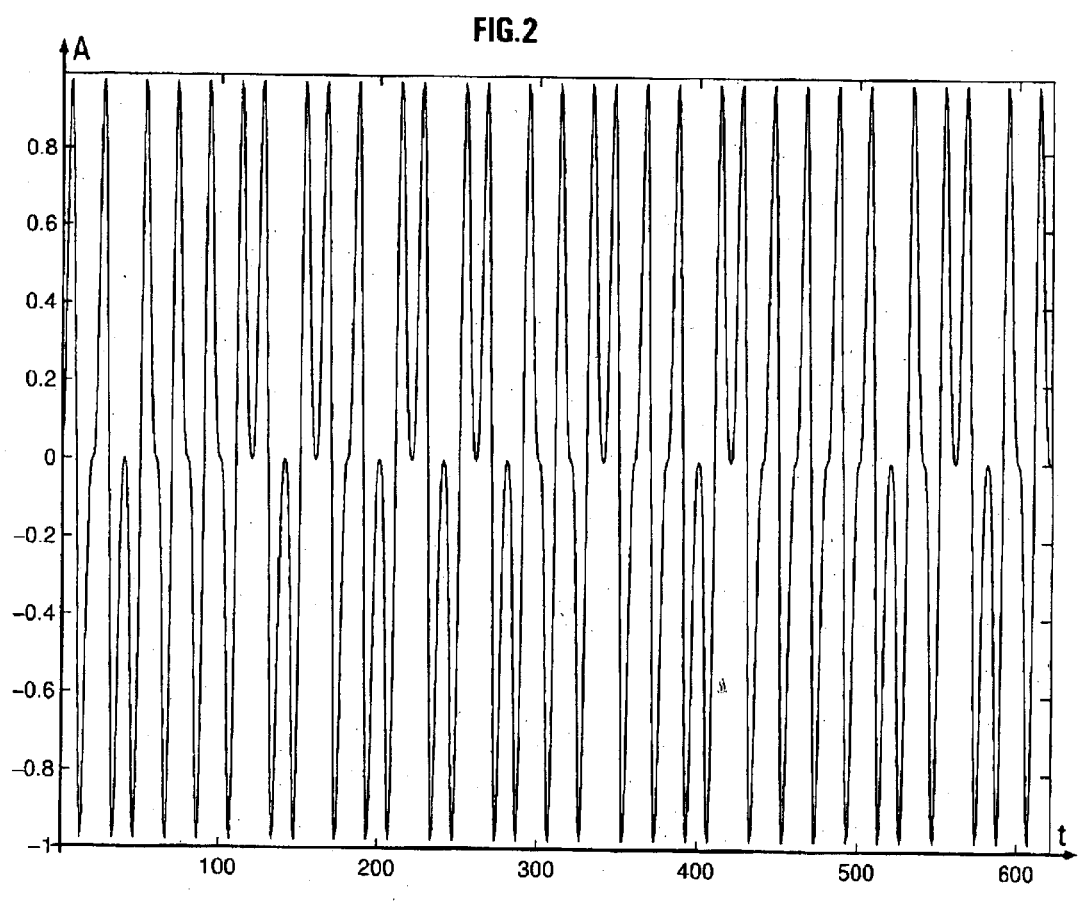

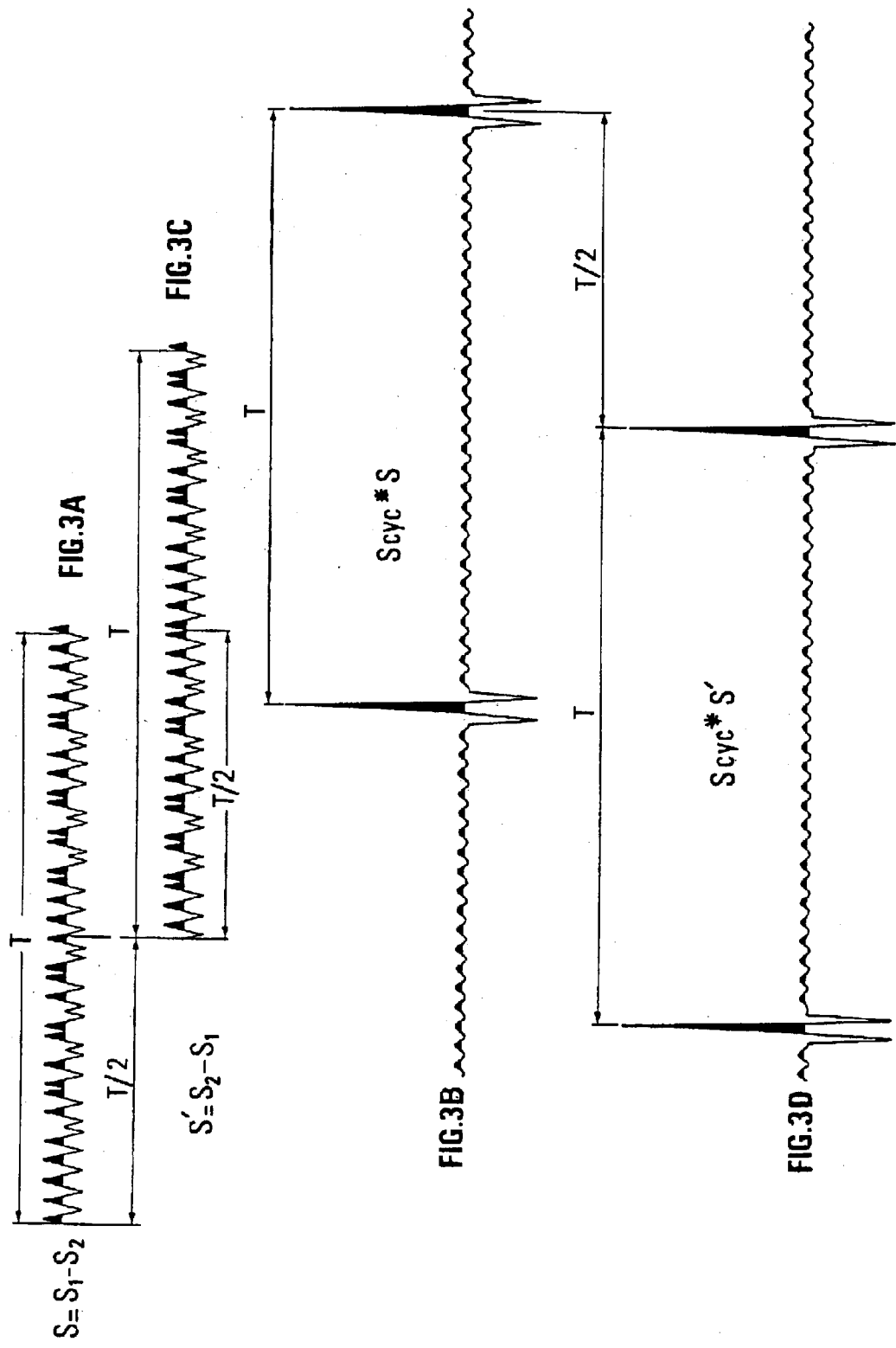

SEISMIC PROSPECTING METHOD AND DEVICE USING SIMULTANEOUS EMISSION OF SEISMIC SIGNALS BASED ON PSEUDO-RANDOM SEQUENCES

BACKGROUND OF THE INVENTION

1. Field of the Invention

The present invention relates to a method and to a device intended for land seismic prospecting by simultaneous emission in the ground of seismic signals emitted by several vibrators or groups of vibrators, the signals being obtained by coding a signal by pseudo-random sequences, and notably a periodic signal phase modulated by such sequences.

2. Description of the Prior Art

There are well-known land seismic prospecting methods comprising transmission in the ground, for several seconds, of a periodic signal whose frequency varies continuously within a frequency band, reception by pickups of the signals reflected by underground reflectors and recording of the received signals. As a result of the emission time, the signals picked up are combinations of signals reflected by reflectors arranged at very different depths. The image of the various reflectors in the subsoil can only be recovered by processing the signals picked up, including correlation thereof with the signals emitted. The processing result is identical to that obtained by convolving the autocorrelation function of the signal emitted by the reflection coefficients of the various reflectors. The seismic trace obtained is the image of the interfaces between the various geologic layers midway between the emission and reception points. Such a method is for example described in U.S. Pat. No. 2,688,124.

This method however has some drawbacks. The autocorrelation function that is obtained in this case exhibits secondary peaks on either side of the main peak, whose amplitude is quite significant. Furthermore, a time interval at least equal to the loop travel time of the waves emitted down to the deepest reflector in the zone explored, referred to as "listening interval", has to be provided between two successive emission sequences so that the strong signals picked up at the beginning of the corresponding recording sequence cannot conceal the weaker signals coming from more distant reflectors, picked up at the end of the previous recording sequence. The necessary emission interruptions during a relatively long listening time interval have the effect of limiting the energy transmitted.

There is also another well-known method wherein various vibrators emit simultaneously signals with an identical frequency sweep, the lag between their emissions being at least equal to the listening time.

Pseudo-random Binary Sequences

Other known land seismic prospecting methods use a technique that is well-known in the field of communications and radars. They comprise using periodic sources that transmit signals obtained by modulating the phase of a periodic carrier signal by a binary signal or pseudo-random code consisting of a sequence of elements that can take on two logical values 0 or 1. As shown in FIG. 1, the order of succession of these values is selected so as to have a random character.

When, for such a code, any sequence of n successive bits (n integer) can be repeated identically only after a sequence of $(2^n-1)$ bits, the sequence is referred to as "Binary Sequence of Maximum Length" (BSML). These pseudo-random binary sequences can be used for phase modulation of a periodic signal, each element of the sequence being associated with a period of the signal, by keeping or by inverting the sign according to whether it is a 1 or a 0. The term "elementary sequence" designates a portion of the periodic signal modulated by a binary sequence of $(2^n-1)$ terms, of length $(2^n-1)Tc$, where Tc is the period of the carrier signal.

Correlation, by an elementary sequence, of a signal consisting of the repetition of this elementary sequence modulated by the elementary sequence (FIG. 3B) gives (FIG. 3C) peaks spaced out (in time) by the length of sequence Ts and a minimum (or even zero) level between the peaks or, more exactly, over the length of the sequence minus the period of the carrier Tc. The ratio of the correlation peak to the correlation noise is equal to the number of terms of the sequence.

Such methods are for example described in U.S. Pat. Nos. 3,234,504, 3,264,606, 4,034,333 and 4,069,470.

U.S. Pat. No. 3,234,504 describes a seismic prospecting method wherein modulated signals without cusps, whose amplitude spectrum is centered on the zero frequency, are applied to a vibrator.

U.S. Pat. No. 4,780,856 filed by the assignee describes a marine seismic prospecting method wherein the emission means comprise at least one vibrator towed by a boat progressing continuously along a seismic profile to be studied, emitting an uninterrupted series of sequences consisting each of a periodic carrier signal phase modulated by a pseudo-random binary coding signal of maximum length. The signals reflected by the discontinuities of the medium are correlated with the coded signals emitted so as to obtain correlation peaks at time intervals shorter than or at most equal to the period of repetition of the successive emission sequences. The periodic source can be the sole source, correlation being carried out between the signals received and alternately two sequences of signals emitted deducible from one another by a time lag shorter than the period of repetition of the sequences. A lag equal to the half-period of repetition of the sequences of signals emitted is for example selected.

It is also possible to use at least two periodic sources emitting simultaneously sequences of identical signals but with a time lag between them, and a correlation is established between the received signals, which correspond to the signals emitted simultaneously by the sources, and at least one sequence of coded signals, so as to alternately obtain correlation peaks corresponding to each periodic source.

The use, in land seismic prospecting, of vibrators emitting simultaneously or insufficiently separated in time has drawbacks linked with various factors: the autocorrelation noise, the harmonics and the slow waves.

Autocorrelation Noise

The vibroseismic signal is compressed by correlating the signals recorded by the signal controlling the vibrator (or by a combination of the signals of the plate and mass accelerometers of the vibrator). The equivalent of the correlation of the series of reflection coefficients is thus obtained by autocorrelation of the emitted signal. The emitted signal is generally a frequency linear sweep whose amplitude spectrum has either a crenellated shape, or it is preferably a bell curve to reduce the amplitude of the bounces.

The question of autocorrelation noises arises for all the vibroseismic records. The bounces decrease with time as a function of 1/t substantially. For an isolated record, the autocorrelation bounces of the large values at the beginning of a trace are sufficiently attenuated when the weakest reflections at the end of a trace reappear. In the case of a frequency slip sweep, recording is semi-continuous and the bounces of the large values are found in front and behind, and they can interfere with the low values of the deep reflections of the previous shot if the slip time is insufficient.

Harmonics

For an isolated vibroseismic record, the harmonic distortion adds oscillations to the correlated signal. If the sweep is carried out from the low frequencies to the high frequencies, the oscillations due to the correlation of the harmonics by the control signal are precursors. Thus, except for the closest traces comprising the surface noise, the noises due to the correlation of the harmonics mix with an earlier, therefore in principle stronger signal. For continuous slip sweep type records, the noise due to the harmonics of the early arrivals of a shot can be superposed on the late and therefore weaker arrivals of the previous shot.

Slow Waves

If the time interval between the start of two successive shots decreases, there is a risk the slowest waves of a shot, air waves and surface waves, may be found on the next shot. The sweeps being identical from one shot to the next, the air wave and the surface noises will be compressed similarly on the two shots.

Minimum Correlation Sequences

It is well-known in the art that there are, for each size of binary sequence of maximum length, minimum correlation pairs for which the ratio of the central peak to the greatest secondary peak is:

$$\frac{2^n - 1}{1 + 2^{wholepart\left(\frac{n+2}{2}\right)}}$$

i.e. about 30 dB for n=11, corresponding to $2^n-1=2047$ periods of the carrier signal (34 seconds for a 60 Hz carrier). There are connected sequences whose correlations are minimum two by two. The number of sequences of each set depends on the size of the sequences. For a sequence with 2047 elements, this number is 4.

French Patent 2,818,753, filed by the assignee, describes a method of prospecting or monitoring operations in an underground formation by elastic waves. It comprises emission, in the ground, of elementary sequences formed by coding of a signal by pseudo-random sequences, reception and recording of the signals reflected by the subsoil discontinuities in response to the signals emitted, and processing of the signals recorded by correlation with signals formed from the emitted signals.

The signals are emitted simultaneously by several seismic sources each controlled by a signal consisting of an elementary sequence whose length is at least equal to the product of the number of seismic sources vibrating simultaneously by the listening time, the respective contributions of the various seismic sources being separated by correlating the signals received and recorded by a cyclic signal portion constructed from the elementary sequence, extended, on the right and on the left (before and after), with parts whose length is at least equal to the listening time, obtained by circular permutation, this elementary sequence occupying the center of the cyclic signal portion.

The signals can also be emitted by several seismic sources each controlled by a signal consisting of an elementary sequence extended, before and after, with parts at least equal to the listening time, obtained by circular permutation, this elementary sequence occupying the center of this cyclic signal portion, the respective contributions of the various seismic sources being separated by correlating the signals received and recorded by signals constructed from the elementary sequence.

This method, which uses periodic signals obtained by phase modulation of a carrier signal by pseudo-random binary sequences, and the simultaneous recording of several seismic sources, allows minimizing the correlation noises and prevents harmonic correlation noises. It is better suited to simultaneous recording than the frequency sweeps conventionally used in land seismic prospecting.

However, it has been observed that the phase modulation of a sinusoid by a pseudo-random code leads to cusps at code sign changes. The signal is distorted upon emission. This distortion is expressed differently when passing between two like terms of the sequence and between two unlike terms. It follows therefrom that the various terms cannot be correctly summed, so that the correlation does not reach the desired performance.

SUMMARY OF THE INVENTION

The method according to the invention allows prospecting or monitoring operations in an underground formation by elastic waves. It comprises simultaneous emission, in the ground, of seismic waves by several seismic sources each controlled by a signal consisting either of an elementary sequence formed by coding of a signal by pseudo-random sequences, the length of the elementary sequence being at least equal to the product of the number of seismic sources vibrating simultaneously by the listening time, or respectively of the elementary sequence extended, before and after, with parts whose length is at least equal to the listening time, reception and recording of the signals reflected by the subsoil discontinuities in response to the signals emitted, and processing of the signals recorded, the respective contribution of each one of the various seismic sources being separated by correlating the received signals and recorded either by signals constructed from the elementary sequence, extended, before and after, with parts whose length is at least equal to the listening time, obtained by circular permutation, or respectively of the elementary sequence. The signals applied to the various vibrators are formed from a periodic signal whose amplitude and derivatives with respect to time are equated to zero at the beginning and at the end of each period, and such that integral of the periodic signal over a period is zero.

The integral over a period being zero prevents the frequency spectrum from being centered on the zero frequency (which of course cannot be emitted in practice) and therefore avoids the real signal deformations resulting therefrom.

According to an embodiment, a signal of frequency f, of the form sin 2πft(1−cos 2πft), is used as the periodic signal.

With this additional condition applied to the periodic signal, the separation obtained of the contributions of the various seismic sources to the recorded signals is much better.

According to a preferred embodiment, the elementary sequences are formed by phase modulation of the periodic signal and these sequences are applied to vibrators.

The same control sequence is, for example applied to all the vibrators, with a time lag and a circular permutation. The time lags between two sequences are at least equal to the listening time, and the length of the elementary control sequence is at least equal to the sum of the time lags and of the listening time.

According to another embodiment, the vibrators are controlled by a connected set of minimum crosscorrelation sequences. Each vibrator emits a vibration with a sequence independent of the other vibrators.

According to another embodiment, the previous two modes are combined by dividing the vibrators into groups, and each group is assigned a pseudo-random sequence belonging to the same group of minimum crosscorrelation sequences, the various vibrators of the same group being controlled by the same elementary sequence with the time lags.

The device which prospects or monitors in a formation by elastic waves according to the invention comprises at least one group of m vibrators, a control unit which applies to the vibrators elementary sequences formed by phase modulation of a periodic signal by pseudo-random sequences, seismic receivers coupled with the formation, a system which acquires and records the seismic signals reflected by the subsoil discontinuities in response to the periodic emitted signals and a system which processes the recorded seismic signals, by correlation with part of the periodic emitted signals. The control unit comprises a periodic signal generator and a modulation set for forming elementary sequences phase modulated by a pseudo-random sequence, and connection means for applying simultaneously to the various vibrators of each group the signals produced by the modulation set.

According to a first embodiment, the modulation set comprises means for generating at least one pseudo-random control sequence, time lag means for forming at least one set of m elementary sequences with time lags between each one of the elementary sequences respectively, means which phase modulates the periodic signals generated by the generator respectively by the m elementary sequences, generating m phase modulated periodic signals.

According to another embodiment, the modulation set comprises means for generating at least one pseudo-random control sequence, modulation means for modulating, by the sequence, the periodic signals generated by the generator, and time lag means for producing m modulated periodic signals with a time lag between each signal.

The device comprises, for example, p groups of vibrators, and the control unit generates p minimum crosscorrelation elementary sequences and to apply these sequences with a time lag to the vibrators of each group.

According to an embodiment of the device, the vibrators are installed permanently for seismic monitoring of an underground zone.

BRIEF DESCRIPTION OF THE DRAWINGS

Other features and advantages of the method and of the device according to the invention will be clear from reading the description hereafter, with reference to the accompanying drawings wherein:

FIGS. 1a to 1b show examples of signals obtained by phase displacement;

FIG. 2 shows an example of a periodic signal whose time derivative is equated to zero at the beginning and at the end of each period;

FIGS. 3a to 3c show examples of signals obtained by correlation by a sequence modified by a time lag;

DETAILED DESCRIPTION OF THE PREFERRED EMBODIMENTS

Figure 4A:
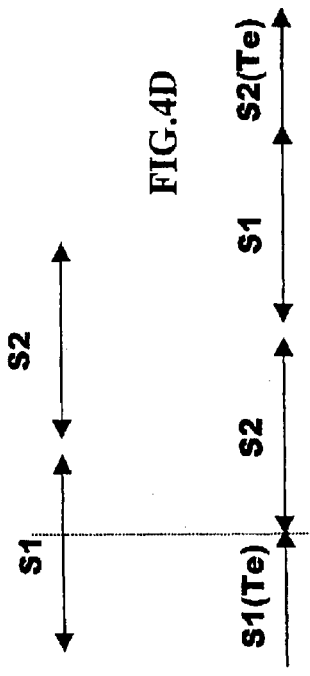
FIGS. 4a to 4e show various recorded signals corresponding to two phase modulated periodic sources that emit simultaneously.
Figure 4B:
Figure 4C:
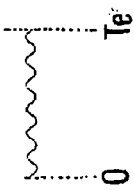
Figure 4D:
Figure 4E:
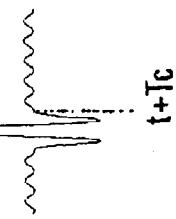

The formation of the control signals obtained by coding, by pseudo-random sequences, of a periodic signal a) that is equated to zero at the beginning and at the end of each period, b) whose derivative with respect to time is also equated to zero at the beginning and at the end of each period, and c) such that its integral over a period is zero is considered hereinafter.

Among all the possible signals having this property, a signal of the form $2\pi ft(1-\cos 2\pi ft)$ can be selected for example (FIG. 2).

Correlation by a Sequence Modified by a Time Lag

A sinusoidal signal of frequency $f_c$ (and of period $T_c=1/f_c$) phase modulated by a BSML sequence (FIG. 1A) is considered. The length of the sequence S thus formed (FIG. 1B) is $T_s=(2^n-1) T_c$, with n an integer. Sequence S is split up into two subsequences $S_1$, consisting of the $2^{n-1}$ first carrier periods of S, and $S_2$, consisting of the rest of the sequence, i.e. $2^{n-1}-1$ carrier periods, $S=(S_1 \; S_2)$ (FIG. 3a). Let $S_{cyc}$ be the signal periodized from sequence S, i.e. consisting of cycles (S S S . . . ). Correlation of $S_{cyc}$ by elementary sequence S gives (FIG. 3b) peaks spaced out by the length of the sequence $T_s$. If another BSML sequence is constructed by applying a time lag of $2^{n-1}$ terms and complement by circular permutation, i.e. sequence $S'=(S_2 \; S_1)$ (FIG. 3c), correlation of $S_{cyc}$ by S' also gives peaks spaced out by a time $T_s$(FIG. 3d). These peaks exhibit a time lag $2^{n-1}T_c$ corresponding to the length of $S_1$ in relation to the peaks of the $S_{cyc}*S$ correlation.

Land Seismic Prospecting—Vibration Time and Listening Time

In land seismic prospecting, the source vibrates at a fixed point and its vibration is interrupted long enough to allow displacement thereof to a next position and coupling with the ground. The relations between the length of the elementary sequence cycle, the vibration time and the listening time therefore have to be determined. What is referred to as "listening time" hereafter is the maximum travel time, between a source and a wave receiver, of an elastic wave that reflected on the deepest reflector in the zone explored.

An underground reflector at the time t (time required for the sound wave to move from the source to the receiver(s) by reflecting on the reflector) is considered. If the source emits a cyclic vibration $S_{cyc}$ of elementary sequence S, this vibration will be recorded from the time t. Correlation by the elementary sequence S gives a peak at the time t, i.e. a signal between $t-T_c$ and $t+T_c$, where $T_c$ is the period of the carrier, other peaks spaced out by multiples of the length of elementary sequence $T_s$, and a minimum noise between the peaks, therefore between $t-T_s+T_c$ and $t+T_s-T_c$.

For a reflector at the time 0, a narrow signal from 0 to $T_c$ and a minimum noise plateau up to $T_s-T \geq T_e$ exists. For a reflector at the time $T_c < t \leq T_e \leq T_s-T_c$, a narrow signal between $t-T_c$ and $t+T_c$ and a minimum correlation noise plateau from 0 to $t-T_c$ and from $t+T_c$ to $T_e$ exists. Correlation of $S_{cyc}$ by the elementary sequence S thereof allows finding again the series of reflection coefficients convolved by a three-arch signal of total width $2T_c$.

For a correlation over a time equal to listening time $T_e$, the signal emitted can be limited to a portion of cyclic signal $S_{cyc}$ of length $T_s+2T_c$ equal to the sum of the length of the sequence and of twice the listening time. The elementary sequence occupies the center of this cyclic signal portion.

Similarly, it is possible to emit a signal consisting of a single elementary sequence and to correlate the record of the signals reflected by a cyclic repetition portion of the elementary sequence of length $T_s+2T_c$. This elementary sequence occupies the center of this cyclic signal portion.

The case is considered when two sources are simultaneously recorded. One source vibrates with signal S of length at least equal to twice the listening time which are split up into two subsequences S1 and S2 with each subsequence being equal to or greater than the listening time. The other source vibrates with the sequence modified by a time lag and completed by circular permutation which consists of the two sequences S2 and S1. The mechanism of separating these two records is illustrated by FIGS. 4a to 4e.

A reflection is considered coming from one of the two simultaneous sources which emits, for example, a signal S whose length is greater than twice the listening time, that can be split up into two subsequences, each one longer than the listening time, S1 and S2 (FIG. 4a). This reflection is a signal similar to the signal emitted, weighted by the reflection coefficient and starting at arrival time t. The corresponding correlation signal (FIG. 4b) is constructed by adding, after emission sequence S1S2, a portion of subsequence S1 starting at the beginning of the subsequence and whose length is at least equal to the listening time, and, before this central sequence, a portion of subsequence S2 whose length is at least equal to the listening time, and ending at the end of the subsequence. Correlation of the reflection by this correlation signal (S2(Te) S1 S2 S1(Te)) over a length equal to the listening time leads to a peak at the time t (FIG. 4c) when central sequence S1S2 of the correlation signal is opposite the reflection. Correlation of the reflection coming from the first source by the correlation signal corresponding to signal S2S1 modified by a time lag, emitted by the second source, constructed by modifying the correlation signal of the first source by the length of S1 and by completing by circular permutation (FIG. 4d), gives, during the listening time, only a minimum correlation noise. Similarly, correlation of a reflection coming from the second source by the correlation sequence corresponding to the second source leads to a correlation peak at the arrival time of this reflection, whereas correlation by the correlation sequence corresponding to the first source will only give a correlation noise maintained at a minimum level.

Correlation, over the length of the listening time, of the records where are superposed the reflections of the waves emitted by two simultaneous sources, alternately by the correlation sequences corresponding to each of the two sources thus allows to separate the reflections coming from both sources.

Generalization to m Sources

The previous result can be generalized for m vibrators. Consider m vibrators vibrating simultaneously for a time $T_v=(m-1)T_c$. The signal emitted by the first vibrator is an elementary sequence whose length is at least equal to the product of the number m of vibrators vibrating simultaneously by the listening time, i.e. $T_s \geq mT_e$. This sequence can be split up into m parts of length $S_1, S_2, \ldots, S_n$ greater than or equal to the listening time. Correlation of the record of a reflected signal, starting to arrive at the time t, by correlation signal $(S_n, S_1, S_2, \ldots, S_n, S_1)$ gives a peak at the time t and a very weak correlation noise everywhere else between 0 and $T_c$. Correlation of the record between 0 and $T_e$ by any one of the sequences deduced from the first sequence by circular permutation with a time lag such as a multiple of $T_e$: $(S_2, S_3, \ldots, S_n, S_1), (S_3, \ldots, S_n, S_1, S_2), \ldots,$ $(S_n, S_1, S_2, \ldots, S_{n-1})$ will only give a minimum correlation noise.

If a second vibrator vibrates at the same time as the first one with a sequence modified by a time lag and completed by circular permutation $S'=S_2 S_3 \ldots S_n$, correlation by S gives only a minimum correlation noise. Only correlation by S' will lead to a peak at the time t.

The record obtained by simultaneously recording several vibrators can thus be split up into components connected to each vibrator by successive correlations with sequences modified by a time lag equivalent to the listening time and completed on the right and on the left by the closest subsequences from the point of view of the circular permutation or, if these subsequences are greater than the listening time, by portions of a length equal to the listening time.

EXAMPLE

Five vibrators are considered vibrating simultaneously with BSML sequences of $2^{10}-1=1023$ terms modulating a 60 Hz carrier and deduced from one another by time lag and circular permutation. The length of the sequence is thus $$\frac{1023}{60} \sim 17$$

seconds. The listening time corresponds (to within some carrier periods) to one fifth of the length of the sequence, i.e.

$$\frac{17}{5} \sim 3.4$$

seconds. The length of the (simultaneous) vibration of the vibrators is 17 seconds. The correlation signal has the length as follows: 17+2×3.4=23.8 s.

Minimum Correlation Sequences

Accepting a correlation noise of −30 dB, it is possible to use for example an emission device comprising 4 lines of 5 vibrators each, vibrating simultaneously and controlled by a 34-s sequence, for a listening time of 6.8 s. On a first line, the vibrators vibrate simultaneously or not, with the same sequence modified by a suitable time lag as described. The next vibrator lines are controlled by sequences belonging to the set of minimum correlation sequences to which the first sequence belongs. The vibrators of each line start as soon as they are in the field and ready to vibrate. It is not necessary to synchronize the start of the various lines. An appreciable productivity gain can thus be obtained.

Figure 5:
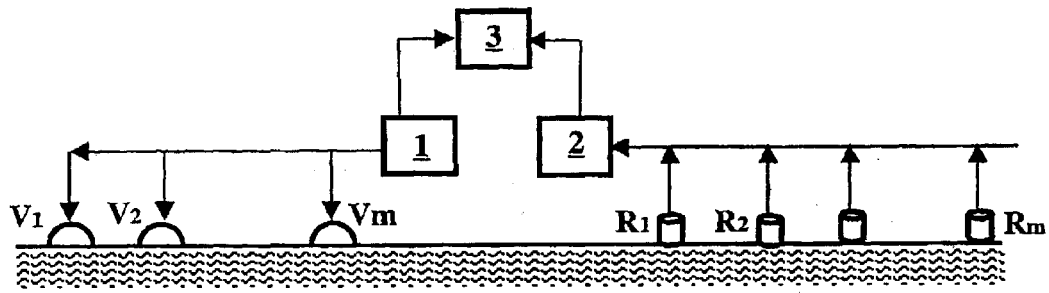
FIG. 5 diagrammatically shows the device.

The implementation device (FIG. 5) comprises a control unit 1 which applies to m vibrators coupled with the formation phase modulated periodic signals, a system 2 which acquires and records the signals picked up by seismic receivers R1–Rk coupled with the formation in response to the periodic emitted signals , and a processing system 3 which processes the seismic signals picked up by receivers R1 to Rk; such as a programmed computer, by correlation with the emitted signals.

Control unit 1 comprises a periodic signal generator 4 and a modulation set MA which generates, from the periodic signals, m phase modulated periodic signals for application to the m vibrators V1–Vm.

Figure 6:
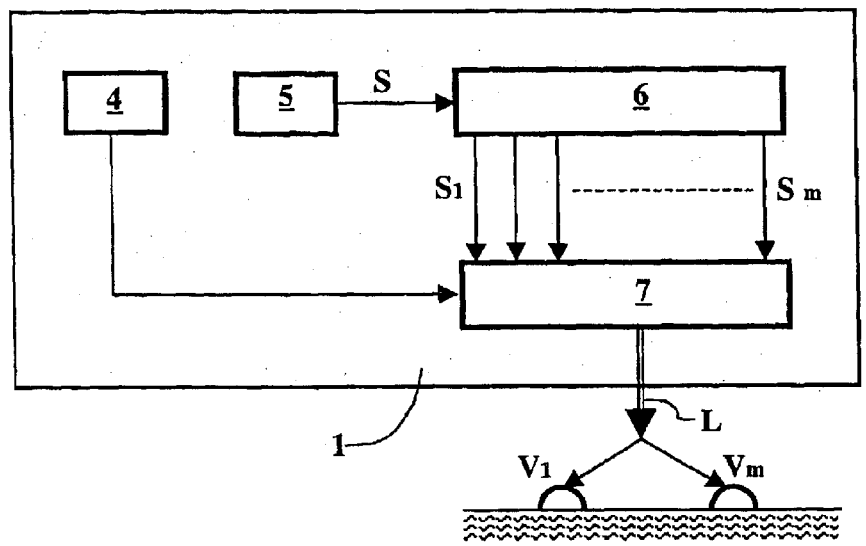
FIG. 6 shows a first embodiment of the control unit intended for the various vibrators.

According to a first embodiment (FIG. 6), modulation set MA comprises means 5 for generating at least one pseudo-random control sequence, elements 6 for producing a time lag so as to form, from the sequence, at least one set of m pseudo-random binary sequences with a time lag between each one respectively. The time lags are distributed over the length of the control sequence according to the number m of vibrators of each group.

A phase modulation device 7 is connected to signal generator 4 and to elements 6 which apply a time lag to the periodic signals. The phase modulation device generates m phase modulated periodic signals. Device 7 is connected by connection means (L) to the various vibrators (V1–Vm) of each group.

Figure 7:
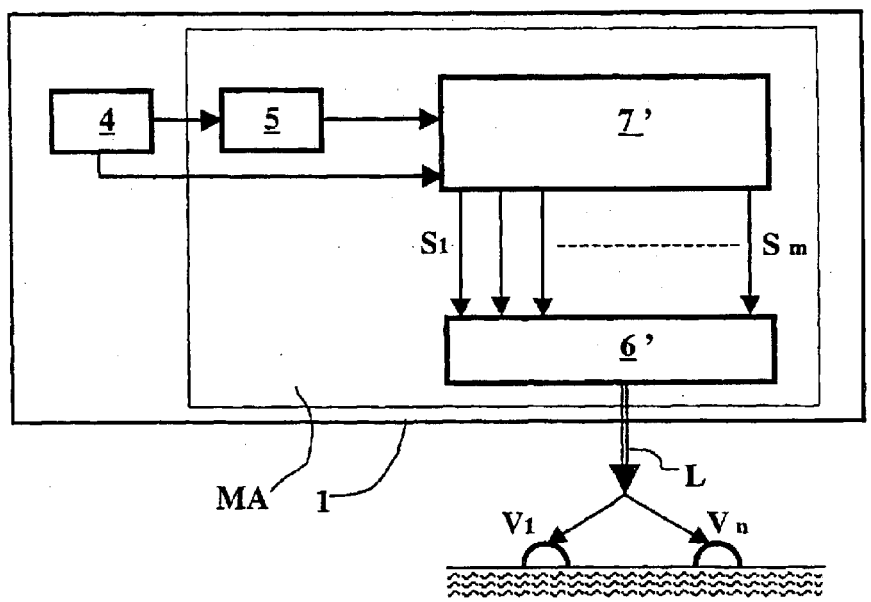
FIG. 7 shows a second embodiment of the control unit intended for the various vibrators.

According to a second embodiment (FIG. 7), modulation set MA comprises means 5 for generating at least one pseudo-random control sequence, a modulation device 7' for modulating the periodic signals generated by generator 4 by the sequence, means 6' for producing m modulated periodic signals comprising a time lag between each one. Device 7' is similarly connected to the various vibrators (V1–Vm) of each group by connection means L.

Any type of pseudo-random sequence can be selected for phase modulation of the signals.

What is claimed is:

1. A method of prospecting or monitoring an underground formation by elastic waves, comprising:

simultaneously emitting, in the ground, seismic waves from seismic sources each controlled by a signal comprising either an elementary sequence formed by coding of a signal by pseudo-random sequences, a length of each elementary sequence being at least equal to a product of a number of seismic sources vibrating simultaneously by a listening time, or with the elementary sequence extended, before and after, with parts whose length is at least equal to the listening time;

receiving and recording the signals reflected by subsoil discontinuities in response to the emitted signals; and processing the recorded signals; and wherein a respective contribution of each one of the seismic sources is separated by correlating the received and recorded signals either by signals constructed from either the elementary sequence, extended, before and after, with parts whose length is at least equal to the listening time, obtained by circular permutation, or of the elementary sequence, the signals applied to the vibrators being formed from a periodic signal having an amplitude and derivatives with respect to time are equal to zero at a beginning and at an end of each period of the periodic signals such that an integral of the periodic signals over a period of the periodic signals is zero.

2. A method as claimed in claim 1, wherein:

a signal of frequency f, of the form $\sin 2\pi ft(1-\cos 2\pi ft)$, is used as the periodic signal.

3. A method as claimed in claim 1, wherein:

the elementary sequences are formed by phase modulation of the periodic signal and are applied to vibrators.

4. A method as claimed in claim 3, wherein:

applying a same control sequence to all the vibrators, with a time lag and a circular permutation, the lags between two vibrators being at least equal to the listening time, and a length of the elementary control sequence being at least equal to the sum of the lags and of the listening time.

5. A method as claimed in claim 3, wherein:

the vibrators are controlled by a connected set of minimum crosscorrelation sequences with each vibrator emitting a vibration with a sequence thereof being independent of the other vibrators.

6. A method as claimed in claim 4, wherein:

dividing the vibrators into groups and assigning a pseudo-random sequence belonging to a same group of minimum crosscorrelation sequences to each group with the vibrators of a group being controlled by a same elementary sequence with the time lags.

7. A method as claimed in claim 5, wherein:

dividing the vibrators into groups and assigning a pseudo-random sequence belonging to a same group of minimum crosscorrelation sequences to each group with the vibrators of a group being controlled by a same elementary sequence with the time lags.

8. A device for prospecting or monitoring of an underground formation by elastic waves, comprising:

a group of at least m vibrators in ground contact;

a control unit which controls the vibrators to emit phase modulated periodic signals into the ground;

seismic receivers coupled by ground contact by ground contact with the formation;

a system which acquires and records the seismic signals reflected by subsoil discontinuities in response to the phase modulated periodic signals; and a system which processes the seismic recorded signals, by correlation with part of the phase modulated periodic signals, wherein the control unit includes a signal generator and a modulation set which forms m elementary sequences phase modulated by a pseudo-random sequence and a connection device which applies simultaneously to the vibrators of each group signals produced by the modulation set to cause the phase modulated periodic signals to be emitted; and wherein the periodic signal is zero amplitude at an end of each period.

9. A device as claimed in claim 8, wherein:

the modulation set generates at least one pseudo-random control sequence, a time lag forms at least one set of m elementary sequences with a time lag between each elementary sequence, a phase modulator phase modulates the periodic signals generated by the generator with m elementary sequences, generating m phase modulated periodic signals.

10. A device as claimed in claim 8, wherein:

the modulation set generates at least one pseudo-random control sequence, a modulator modulates, using the sequence, the periodic signals generated by the signal generator, and a time lag produces m modulated periodic signals with a time lag between each elementary sequence.

11. A device as claimed in claim 8, wherein:

the control unit emits the signals during a time dependent upon a length of each control sequence and on a received vibrational signal listening time.

12. A device as claimed in claim 9, wherein:

the control unit emits the signals during a time dependent upon a length of each control sequence and on a received vibrational signal listening time.

13. A device as claimed in claim 8 comprising:

p groups of vibrators with the control unit generating p minimum crosscorrelation elementary sequences and applying the sequences to the vibrators of each group with a time lag.

14. A device as claimed in claim 9, comprising:

p groups of vibrators with the control unit generating p minimum crosscorrelation elementary sequences and applying the sequences to the vibrators of each group with a time lag.

15. A device as claimed in claim 10, comprising:

p groups of vibrators with the control unit generating p minimum crosscorrelation elementary sequences and applying the sequences to the vibrators of each group with a time lag.

16. A device as claimed in claim 11, comprising:

p groups of vibrators with the control unit generating p minimum crosscorrelation elementary sequences and applying the sequences to the vibrators of each group with a time lag.

17. A device as claimed in claim 8, wherein:

the vibrators are permanently installed for seismic monitoring of an underground zone.

18. A device as claimed in claim 9, wherein:

the vibrators are permanently installed for seismic monitoring of an underground zone.

19. A device as claimed in claim 10, wherein:

the vibrators are permanently installed for seismic monitoring of an underground zone.

20. A device as claimed in claim 11, wherein:

the vibrators are permanently installed for seismic monitoring of an underground zone.

21. A device as claimed in claim 12, wherein:

the vibrators are permanently installed for seismic monitoring of an underground zone.

22. A device as claimed in claim 13, wherein:

the vibrators are permanently installed for seismic monitoring of an underground zone.

23. A device as claimed in claim 14, wherein:

the vibrators are permanently installed for seismic monitoring of an underground zone.

24. A device as claimed in claim 15, wherein:

the vibrators are permanently installed for seismic monitoring of an underground zone.

25. A device as claimed in claim 16, wherein:

the vibrators are permanently installed for seismic monitoring of an underground zone.

26. A device in accordance with claim 8 wherein:

the periodic signal has an amplitude and derivatives with respect to time equal to zero at a beginning and at an end of each period of the periodic signals such that an integral of the periodic signals over a period of the periodic signals is zero.

27. A device in accordance with claim 9 wherein:

the periodic signal has an amplitude and derivatives with respect to time equal to zero at a beginning and at an end of each period of the periodic signals such that an integral of the periodic signals over a period of the periodic signals is zero.

28. A device in accordance with claim 10 wherein:

the periodic signal has an amplitude and derivatives with respect to time equal to zero at a beginning and at an end of each period of the periodic signals such that an integral of the periodic signals over a period of the periodic signals is zero.

29. A device in accordance with claim 11 wherein:

the periodic signal has an amplitude and derivatives with respect to time equal to zero at a beginning and at an end of each period of the periodic signals such that an integral of the periodic signals over a period of the periodic signals is zero.

30. A device in accordance with claim 13 wherein:

the periodic signal has an amplitude and derivatives with respect to time equal to zero at a beginning and at an end of each period of the periodic signals such that an integral of the periodic signals over a period of the periodic signals is zero.

* * * * *